United States Patent
Mandyam (10) Patent No.: US 10,009,761 B2
(45) Date of Patent: Jun. 26, 2018

(54) APPARATUS AND METHOD HAVING BROADCAST KEY ROTATION

(71) Applicant: QUALCOMM Incorporated, San Diego, CA (US)

(72) Inventor: Giridhar Dhati Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/754,114

(22) Filed: Jun. 29, 2015

(65) Prior Publication Data
US 2016/0234682 A1    Aug. 11, 2016

Related U.S. Application Data

(60) Provisional application No. 62/113,270, filed on Feb. 6, 2015.

(51) Int. Cl.
*H04L 9/32* (2006.01)
*H04W 12/04* (2009.01)
(Continued)

(52) U.S. Cl.
CPC .......... *H04W 12/04* (2013.01); *G06F 21/10* (2013.01); *H04L 9/0891* (2013.01); *H04N 21/2347* (2013.01); *H04N 21/26613* (2013.01); *H04N 21/4405* (2013.01); *H04N 21/63345* (2013.01); *H04N 21/8456* (2013.01); *H04W 12/02* (2013.01); *H04W 12/06* (2013.01); *G06F 2221/0753* (2013.01); *H04L 2463/101* (2013.01)

(58) Field of Classification Search
CPC ............................ H04L 9/0811; H04L 9/0838
USPC ........................................................ 713/171
See application file for complete search history.

(56) References Cited

U.S. PATENT DOCUMENTS

| | | |
|---|---|---|
| 2005/0192904 A1 | 9/2005 | Candelore |
| 2007/0014536 A1 | 1/2007 | Hellman et al. |

(Continued)

FOREIGN PATENT DOCUMENTS

| | | |
|---|---|---|
| CN | 104009838 A | 8/2014 |
| WO | WO-2014090761 A1 | 6/2014 |

OTHER PUBLICATIONS

Hartung F., et al., "DRM Protected Dynamic Adaptive HTTP Streaming," Feb. 23, 2011 (Feb. 23, 2011). XP055064987, MMSys' 11, Feb. 23-25, 2011, San Jose, California, USA, Retrieved from the Internet : URL:http://www.hartung.fh-aachen.de/publications/ACM_MMSys2011_p277.pdf [retrieved-on Jun. 3, 2013].

(Continued)

*Primary Examiner* — Anthony Brown
(74) *Attorney, Agent, or Firm* — Loza & Loza LLP (57) ABSTRACT

A method, comprising: receiving an encrypted segment of media data with an encrypted segment key over a unidirectional over-the-air (OTA) broadcast channel; providing an attestation request to an authenticator; receiving an attestation response from the authenticator based on an interaction with hardware to authenticate a user; decrypting, after receiving the attestation response, the encrypted segment of media data using a segment key to generate a decrypted segment of media data, wherein the segment key is based on the encrypted segment key.

23 Claims, 4 Drawing Sheets

(51) Int. Cl.
  *H04N 21/2347* (2011.01)
  *H04N 21/266* (2011.01)
  *H04N 21/4405* (2011.01)
  *H04N 21/6334* (2011.01)
  *H04N 21/845* (2011.01)
  *G06F 21/10* (2013.01)
  *H04L 9/08* (2006.01)
  *H04W 12/06* (2009.01)
  *H04W 12/02* (2009.01)

(56) References Cited

U.S. PATENT DOCUMENTS

| | | | |
|---|---|---|---|
| 2009/0016537 A1* | 1/2009 | Ju | H04H 60/15 380/278 |
| 2012/0182180 A1* | 7/2012 | Wolf | G01S 5/021 342/357.29 |
| 2013/0108042 A1 | 5/2013 | Yin | |
| 2013/0290233 A1* | 10/2013 | Ferren | G06K 9/3266 706/46 |
| 2014/0013103 A1 | 1/2014 | Giladi et al. | |
| 2014/0020111 A1 | 1/2014 | Wang et al. | |
| 2014/0237505 A1 | 8/2014 | Rothschild et al. | |
| 2014/0282687 A1 | 9/2014 | Kummer | |
| 2014/0310518 A1 | 10/2014 | Giladi | |
| 2014/0365759 A1 | 12/2014 | Wang et al. | |

OTHER PUBLICATIONS

International Search Report and Written Opinion—PCT/US2016/012886—ISA/EPO—dated Apr. 25, 2016.

3GPP Draft; DASH-IF-IOP-V2.90, 3rd Generation Partnership Project (3GPP), Mobile Competence Centre; 650, Route Des Lucioles; F-06921 Sophia-Antipolis Cedex; France, Jan. 28, 2015 (Jan. 28, 2015), pp. 1-68, XP050943835, Retrieved from the Internet: URL: http://www.3gpp.org/ftp/Meetings_3GPP_SYNC/SA4/Docs/ [retrieved on Jan. 28, 2015].

* cited by examiner

APPARATUS AND METHOD HAVING BROADCAST KEY ROTATION

CROSS-REFERENCE TO RELATED APPLICATION

This application claims the benefit of U.S. Provisional Application No. 62/113,270, filed Feb. 6, 2015, which application is incorporated herein by reference.

BACKGROUND

Field

The present invention relates generally to key rotation for Digital Rights Management (DRM) Systems using broadcast technologies.

Background

Broadcast content protection is subject to attacked by various means. Once a broadcast key is exposed, the protection may be compromised. Changing the broadcast key, or using encrypted short-term keys, may improve the protection, but may not be sufficient.

There is therefore a need for a technique for authentication in a broadcast system using key rotation for DRM.

SUMMARY

An aspect of the present invention may reside in a method, comprising: receiving an encrypted segment of media data and an encrypted segment key over a unidirectional over-the-air (OTA) broadcast channel; providing an attestation request to an authenticator; receiving an attestation response from the authenticator based on an interaction with hardware to authenticate a user; decrypting, after receiving the attestation response, the encrypted segment of media data using a segment key to generate a decrypted segment of media data, wherein the segment key is based on the encrypted segment key.

In more detailed aspects of the invention, the method may further comprise providing the decrypted segment of media data for presentation to the user. The interaction with hardware may include receiving a personal identification number (PIN) from the user. The encrypted segment of media data may be received with the encrypted segment key.

In other more detailed aspects of the invention, the method may further comprise receiving a second encrypted segment of media data and a second encrypted segment key over the OTA broadcast channel; and decrypting, after receiving the attestation response, the second encrypted segment of media data using a second segment key, wherein the second segment key is based on the second encrypted segment key. The second encrypted segment of media data may be received with the second encrypted segment key.

Another aspect of the invention may reside in a receiver, comprising: means for receiving an encrypted segment of media data and an encrypted segment key over a unidirectional over-the-air (OTA) broadcast channel; means for providing an attestation request; means for receiving an attestation response, wherein the attestation response is based on an interaction with hardware to authenticate a user; means for decrypting, after receiving the attestation response, the encrypted segment of media data using a segment key to generate a decrypted segment of media data, wherein the segment key is based on the encrypted segment key In more detailed aspects of the invention, the hardware may include a token that is verified by an authenticator. The hardware may also include an iris scanner for scanning an iris of the user, and/or a fingerprint scanner for scanning a fingerprint of the user.

Another aspect of the invention may reside in a receiver, comprising a processor configured to: receive an encrypted segment of media data and an encrypted segment key over a unidirectional over-the-air (OTA) broadcast channel; provide an attestation request; receive an attestation response based on an interaction with hardware to authenticate a user; decrypt, after receiving an attestation response, the encrypted segment of media data using a segment key to generate a decrypted segment of media data, wherein the segment key is based on the encrypted segment key.

Another aspect of the present invention may reside in a computer program product, comprising computer-readable medium, comprising: code for causing a computer to receive an encrypted segment of media data and an encrypted segment key over a unidirectional over-the-air (OTA) broadcast channel; code for causing a computer to provide an attestation request; code for causing a computer to receive an attestation response based on an interaction with hardware, code for causing a computer to decrypt, after receiving the attestation response, the encrypted segment of media data using a segment key to generate a decrypted segment of media data, wherein the segment key is based on the encrypted segment key.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
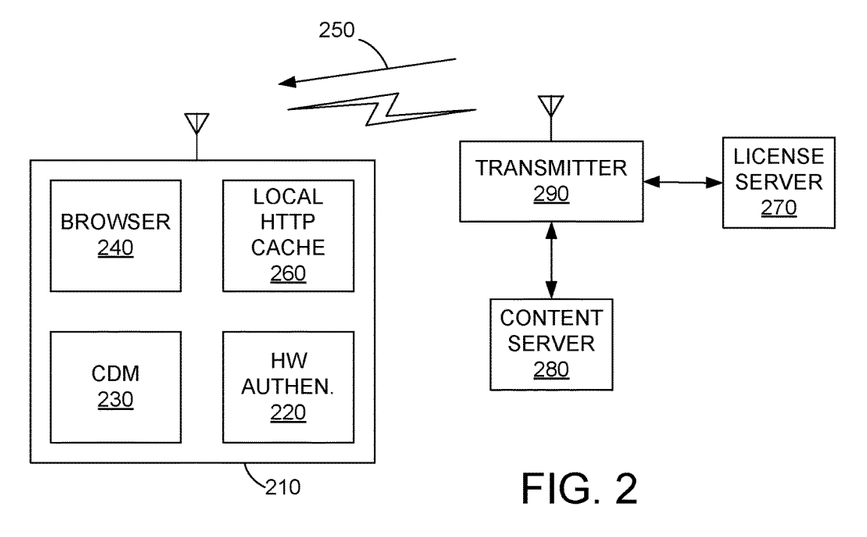
FIG. 2 is a block diagram of an embodiment of a broadcast system with attestation, according to the present invention.
Figure 3:
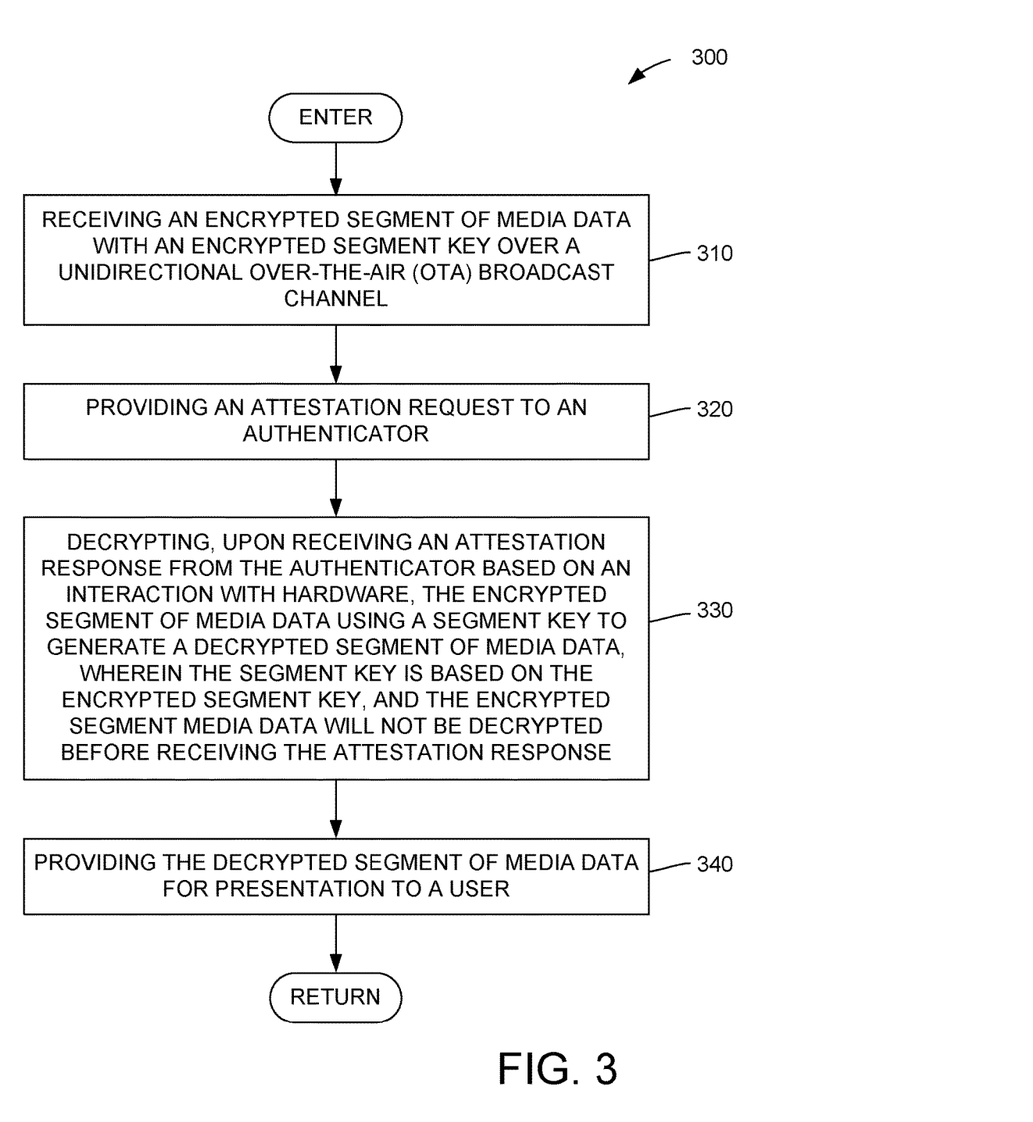
FIG. 3 is a flow diagram of a method for attestation, according to the present invention.

With reference to FIGS. 2 and 3, an aspect of the present invention may reside in a receiver 210 comprising an authenticator 220, a content decryption module (CDM) 230, and a browser 240. An encrypted segment of media data may be received with an encrypted segment key over a unidirectional over-the-air (OTA) broadcast channel 250 (step 310). The authenticator may be configured to receive an attestation request and to provide an attestation response. The attestation response may based on an interaction with hardware (HW). The CDM may be configured to provide the attestation request to the authenticator (step 320). The CDM may be configured to decrypt, upon receiving the attestation response from the authenticator, the encrypted segment of media data using a segment key to generate a decrypted segment of media data (step 330). The segment key may be based on the encrypted segment key. The CDM may not decrypt the encrypted segment media data before receiving the attestation response. The browser may be configured to receive the decrypted segment of media data for presentation to a user (e.g., step 340). Means for receiving the encrypted segment of media data with the encrypted segment key may include the browser 240, a local HTTP cache 260, an antenna and/or a processor 610 (FIG. 6), of the receiver 210.

In more detailed aspects of the invention, CDM 230 may be further configured to decrypt an encrypted second segment of media data using a second segment key to generate a decrypted second segment of media data. The encrypted second segment may be received with an encrypted second segment key over the unidirectional OTA broadcast channel 250. The second segment key may be based on the encrypted second segment key, and the CDM may not decrypt the encrypted second segment media data before receiving the attestation response. The browser 240 may be further configured to receive the decrypted second segment of media data for presentation to a user.

Figure 6:
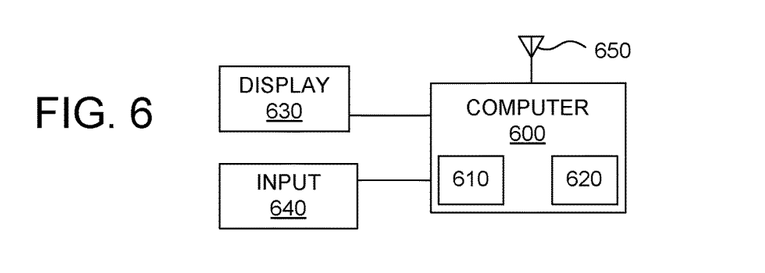
FIG. 6 is a block diagram of a computer including a processor and a memory.

With further reference to FIG. 6, the receiver 210 (e.g., remote station 102 (FIG. 1)) may comprise a computer 600 that includes a processor 610, a storage medium 620 such as memory and/or a disk drive, a display 630, and an input such as a keypad 640, and a wireless network/internet connection 650. The processor may include a secure environment such as a TrustZone of the ARM architecture (trusted platform module (TPM)).

Another aspect of the invention may reside in a receiver 210, comprising: means (e.g., processor 610, browser 210, cache 260, and/or an antenna) for receiving an encrypted segment of media data with an encrypted segment key over a unidirectional over-the-air (OTA) broadcast channel; means (e.g., authenticator 220 of the receiver 210 and/or the processor 610) for receiving an attestation request and providing an attestation response, wherein the attestation response is based on an interaction with hardware; means for providing the attestation request; means (e.g., CDM 230 of the receiver 210 and/or the processor 610) for decrypting, upon receiving the attestation response, an encrypted segment of media data using a segment key to generate a decrypted segment of media data, wherein the segment key is based on the encrypted segment key, and the encrypted segment media data will not be decrypted before receiving the attestation response; and means for receiving the decrypted segment of media data for presentation to a user (e.g., browser 240 of the receiver 210 and/or the processor 610).

Another aspect of the invention may reside in a receiver 210, comprising a processor 610 configured to: receive an encrypted segment of media data with an encrypted segment key over a unidirectional over-the-air (OTA) broadcast channel; provide an attestation request; decrypt, upon receiving an attestation response based on an interaction with hardware, the encrypted segment of media data using a segment key to generate a decrypted segment of media data, wherein the segment key is based on the encrypted segment key, and the processor will not decrypt the encrypted segment media data before receiving the attestation response; and provide the decrypted segment of media data for presentation to a user.

Another aspect of the invention may reside in a method 300, comprising: receiving an encrypted segment of media data with an encrypted segment key over a unidirectional over-the-air (OTA) broadcast channel (step 310); providing, by a content decryption module (CDM), an attestation request to an authenticator (step 320); decrypting, by the CDM upon receiving an attestation response from the authenticator based on an interaction with hardware, the encrypted segment of media data using a segment key to generate a decrypted segment of media data (step 330), wherein the segment key is based on the encrypted segment key, and the CDM will not decrypt the encrypted segment media data before receiving the attestation response; and providing, by the CDM, the decrypted segment of media data for presentation to a user (step 340).

Another aspect of the present invention may reside in a computer program product, comprising computer-readable medium 620, comprising: code for causing a computer 600 to receive an encrypted segment of media data with an encrypted segment key over a unidirectional over-the-air (OTA) broadcast channel; code for causing a computer 600 to provide an attestation request; code for causing a computer to decrypt, upon receiving an attestation response based on an interaction with hardware, the encrypted segment of media data using a segment key to generate a decrypted segment of media data, wherein the segment key is based on the encrypted segment key, and the computer will not decrypt the encrypted segment media data before receiving the attestation response; and code for causing a computer to provide the decrypted segment of media data for presentation to a user.

Web-based DRM techniques that leverage Common Encryption (CENC) have achieved near-ubiquity in browsers via a W3C standard known as Encrypted Media Extensions (EME). EME expects the presence of a broadband connection in order to ensure key rotation and cryptographic robustness. Next-generation broadcast technologies (DVB-T, ATSC 3.0) are expected to leverage web-based runtime environments, particularly those that take advantage of the latest decryption implementations such as EME. These broadcast systems have to work even if broadband access is not available. The present invention supports key rotation when broadband access cannot be leveraged for key reception.

Figure 5:
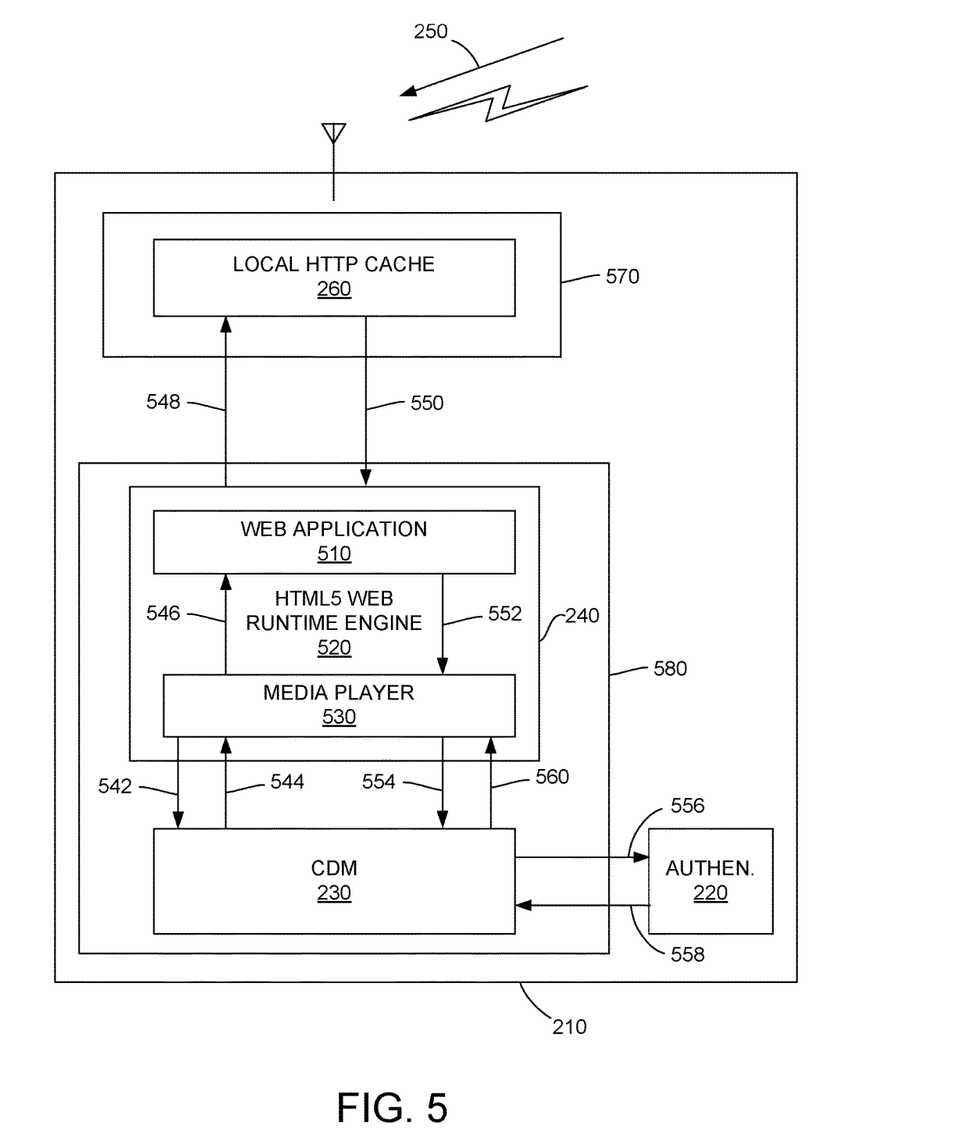
FIG. 5 is a block diagram of an embodiment of a receiver with attestation, according to the present invention.

An aspect of the present invention may use HW-based authentication and the associated assertion to restrict decryption only to authorized end users. EME, and its associated architecture may be used as-is, but key material may be from a local HTTP cache 260 that acts as a proxy for broadcast-transmitted key material.

The ATSC 3.0 broadcast technology is expected to ensure content rights by supporting both subscription and pay-per-view capabilities for both real-time and non-real-time content delivery. Content encryption is a key feature for enabling paid access to media. Dynamic Adaptive Streaming over HTTP (DASH) allows for content encryption as part of the ISO BMFF (base media file format) file structure. Also, Encrypted Media Extensions, a W3C standard that extends HTML5, allows embedded video players (<video>) to manage DRM (w3c-dot-github-dot-io/encrypted-media/).

Common encryption (CENC) enables multiple DRM systems with a common content format. Standard encryption techniques are used, and encryption metadata is used to assist in decryption. Key mapping may be used. The DRM systems may still be differentiated through rights management techniques such as key retrieval/rotation and storage. CENC may be readily leveraged for subscription services from multiple content providers Real-time Object delivery over Unidirectional Transport (ROUTE)/DASH may support CENC. The encryption metadata may be part of the ISO BMFF file structure. Therefore, no specific signaling is required. DASH segments are, via ISO BMFF coordination, inherently compatible with MPEG Common Encryption (CENC) and conform to associated W3C specifications.

ROUTE/DASH may use HTML5 features for high-value content. Encrypted Media Extensions (EME) allows for key maintenance for premium content. EME allows for key material to be updated via a broadband connection, for service initialization and also key rotation. ROUTE object-based delivery enables valid DASH segments to be delivered intact to the ATSC 3.0 receiver. Special mechanisms in the transport layer are not needed to associate subscriptions to the decryption of content.

With reference to FIG. 5, HTML5 readily supports CENC. EME may be defined for video playback in a web application. EME enables CENC, key store, and key management, and is compatible with ISO/IEC 23001 part 7. The content decryption module (CDM) 230 is opaque to the web application 510 and the web runtime engine 520. Thus, it works like any other browser plug-in.

Figure 4:
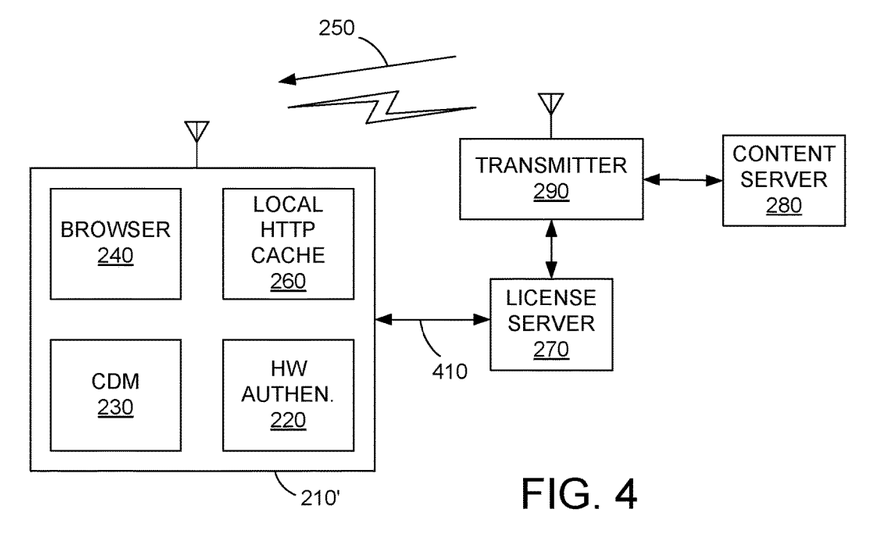
FIG. 4 is a block diagram of another embodiment of a broadcast system.

For cryptographic security in EME, key rotation ensures continued content encryption in the case that key material falls into the wrong hands. Key rotation is supported in CENC and may be implemented by EME. A video (/media) player 530 detects a key refresh event. These may be done without impact to the ATSC 3.0 transport layer or signaling, and may be opaque to web application. The web application may not be able retrieve key material directly from the appropriate license server because a broadband connection 410 (FIG. 4) may not be available. Thus, retrieval may be from the local HTTP cache 260. The local HTTP cache may be stored in a memory 570 (e.g., storage medium 620 (FIG. 6)).

DASH ISO BMFF also allows for refresh of initialization vectors per segment. Additional security may protect media even when key rotation is not sufficiently frequent.

The media player 530 may send a decrypt request 542 to the CDM 230. The CDM may send a license request 544, which may be forwarded to the web application 510 in a license request 546. A get license command 548 may be sent to the local HTTP cache 260, which may respond with the license 550. The cache 260 may receive the license OTA. An update keystore message 552 may be sent from the web application to the media player. The update keystore message 554 may be forwarded to the CDM.

The CDM may request attestation 556 (e.g., if not fresh). The authenticator may return an attestation response 558 based on an interaction with HW. If the attestation response is received (with an indication of successful HW interaction), the CDM may decrypt content segments of the subject content, using segment keys (rotating broadcast keys). The CDM forwards the decrypted segment (and/or frame) 560 to the HTML5 web runtime engine 520/media player 530 for presentation to the user. The CDM 230 and the browser 240, with the web application 510, the HTML5 web runtime engine 540, and the media player 530, may be executed using a processor 580 (e.g., processor 610 (FIG. 6)).

The segment keys may be encrypted when broadcast. The key for decrypting the segments keys may be based on a hardwired key and/or certificate in the receiver available only to the TPM (implementing the CDM). Alternatively, the key and/or certificate for allowing decryption of the encrypted segment keys may be implemented in a secure memory of, e.g., the TPM.

Using these techniques: CENC support is assured, key rotation is built-in, and subscription/PPV support is possible. However, not having IP/Transport security may lead to man-in-the-middle (MITM) vulnerability. Tradeoffs/compromises include: use of a broadband connection for CENC key rotation may not be available, and there are issues with relying on unidirectional transport alone. For example: Blu-Ray content protection has been repeatedly defeated through compromise of keying material. Some measure of MITM protection may be possible through IP Multicast techniques (e.g. IP Auth Header), however key distribution/rotation for IP Multicast is not straightforward (e.g. multicast distribution trees). Using a fixed key or broadcasted key can lead to same MITM vulnerability.

Relying on a broadband connection for key rotation is desirable, but EME/CENC should work (for, e.g., ATSC 3.0) when a broadband connection is not available. This may occur if end user has not configured broadband connection on the receiver, or simply does not have broadband access. The delivery of the key material via broadcast is possible. All messaging from a license server 270 over broadcast should be encrypted (including encrypted key transfer). Also, the application should know the broadcast location (e.g. IP address/port) for key material. This may be signaled OTA or known a priori. The CDM may manage key freshness.

Two-way communication between the CDM 230 and a local license server through an application may be possible (if required), by replicating a license server functionality at the receiver 210. This may not be an ideal approach. It would be better to provide media initialization data from the application prior to video playback. A communication trigger may be from broadcast signaling.

Broadcast key delivery and assertion may have issues. The broadcast interfaces (e.g, transmitter 290) are susceptible to MITM attacks. IP Encryption may mitigate this, but IP multicast encryption techniques also need key rotation to remain robust. Without a broadband connection, vulnerabilities are introduced. Key encryption for OTA broadcast delivery possible, but that may require hard coding at receiver 210

A pre-installed certificate may be used to decrypt the broadcast key. Augmentation of the protection of the encrypted broadcast key may be possible using HW-based authentication. The HW-based authentication may involve an interaction with HW, such as fingerprint sensors, proof-of-possession mechanisms/devices (e.g. HW tokens (Cable-Card, dongles, or the like)), iris scans, PIN entry, etc. Such HW devices may not be integrated into the receiver 210, but may be available via connections such as bluetooth (BT), USB, etc.

A HW-based authenticator 220 may attest to the CDM 230 that authentication of a user has occurred without providing the authentication data, by using an attestation response (HW attestation). Thus, unauthorized users may not get to decrypted media without the attestation response providing a confirmation of the user's authorization to receive the subject encrypted broadcast from a content server 280.

Thus, an aspect of the present invention may use EME and CENC for unidirectional broadcast content (e.g., ATSC 3.0 media) requiring encryption. This avoids IP layer encryption or conditional access mechanisms. A mechanism is defined for broadcast-only key rotation (although a broadband connection could be used, if available). Broadcasters/content providers can decide whether to support the unidirectional broadcast delivery mechanisms. Additional on-device authentication/decryption mechanisms could be recommended, but not necessarily strictly required With reference to FIG. 1, a wireless remote station (RS) 102 (e.g. a mobile station MS) may communicate with one or more base stations (BS) 104 of a wireless communication system 100. The wireless communication system 100 may further include one or more base station controllers (BSC)

Figure 1:
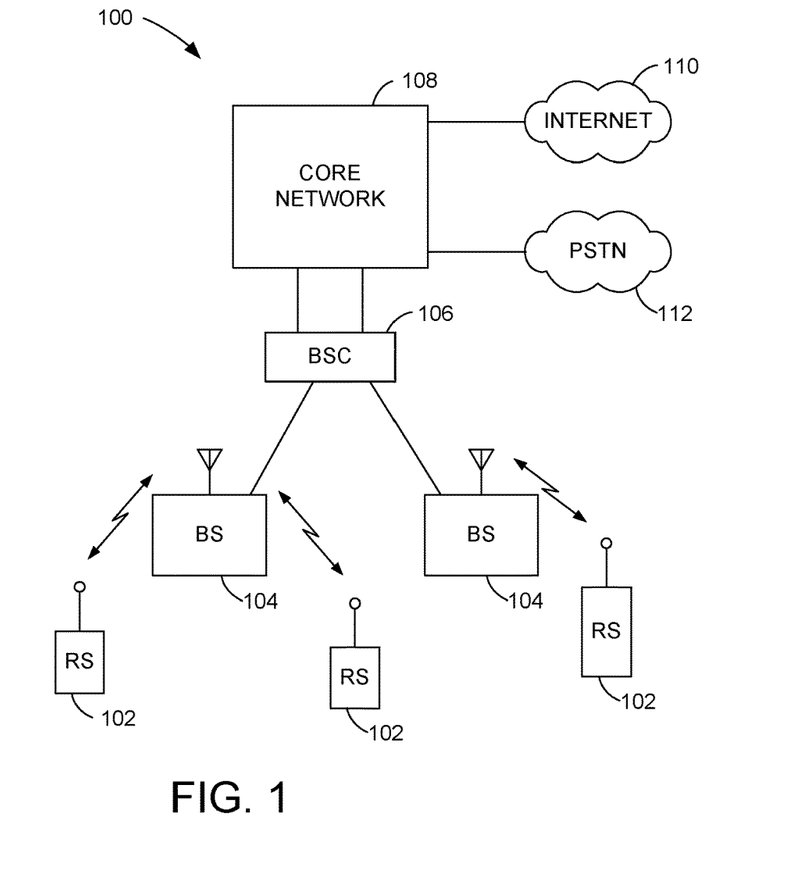
FIG. 1 is a block diagram of an example of a wireless communication system.

106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for decrypting media data, comprising:
   receiving, by a receiver, an encrypted segment of media data and an encrypted segment key over a unidirectional over-the-air (OTA) broadcast channel;
   providing an attestation request to an authenticator, wherein the authenticator is within the receiver;
   receiving an attestation response from the authenticator based on an interaction with authentication hardware to authenticate a user of the receiver; and
   decrypting, after receiving the attestation response, the encrypted segment of media data using a segment key to generate a decrypted segment of media data, wherein the segment key is based on the encrypted segment key.

2. The method of claim 1, further comprising:
   providing the decrypted segment of media data for presentation to the user.

3. The method of claim 1, wherein the interaction with the authentication hardware is at the receiver, and includes receiving a personal identification number (PIN) from the user.

4. The method of claim 1, wherein the encrypted segment of media data is received with the encrypted segment key.

5. The method of claim 1, further comprising:
  receiving a second encrypted segment of media data and a second encrypted segment key over the OTA broadcast channel; and
  decrypting, after receiving the attestation response, the second encrypted segment of media data using a second segment key, wherein the second segment key is based on the second encrypted segment key.

6. The method of claim 5, wherein the second encrypted segment of media data is received with the second encrypted segment key.

7. A receiver, comprising:
  means for receiving an encrypted segment of media data and an encrypted segment key over a unidirectional over-the-air (OTA) broadcast channel;
  means for providing an attestation request to an authenticator, wherein the authenticator is within the receiver;
  means for receiving an attestation response from the authenticator, wherein the attestation response is based on an interaction with authentication hardware to authenticate a user of the receiver; and
  means for decrypting, after receiving the attestation response, the encrypted segment of media data using a segment key to generate a decrypted segment of media data, wherein the segment key is based on the encrypted segment key.

8. The receiver of claim 7, further comprising:
  means for providing the decrypted segment of media data for presentation to the user.

9. The receiver of claim 7, wherein the authentication hardware includes a token that is verified by an authenticator.

10. The receiver of claim 7, wherein the authentication hardware includes an iris scanner for scanning an iris of the user.

11. The receiver of claim 7, wherein the authentication hardware includes a fingerprint scanner for scanning a fingerprint of the user.

12. The receiver of claim 7, wherein the interaction with authentication hardware includes receiving a personal identification number (PIN) from the user.

13. The receiver of claim 7, wherein the encrypted segment of media data is received with the encrypted segment key.

14. A receiver, comprising:
  a processor configured to:
    receive an encrypted segment of media data and an encrypted segment key over a unidirectional over-the-air (OTA) broadcast channel;
    provide an attestation request to an authenticator, wherein the authenticator is within the receiver;
    receive an attestation response from the authenticator based on an interaction with authentication hardware to authenticate a user of the receiver; and
    decrypt, after receiving the attestation response, the encrypted segment of media data using a segment key to generate a decrypted segment of media data, wherein the segment key is based on the encrypted segment key.

15. The receiver of claim 14, wherein the processor is further configured to:
  provide the decrypted segment of media data for presentation to the user.

16. The receiver of claim 14, wherein the authentication hardware includes a token that is verified by an authenticator.

17. The receiver of claim 14, wherein the authentication hardware includes an iris scanner for scanning an iris of the user.

18. The receiver of claim 14, wherein the authentication hardware includes a fingerprint scanner for scanning a fingerprint of the user.

19. The receiver of claim 14, wherein the interaction with authentication hardware includes receiving a personal identification number (PIN) from the user.

20. The receiver of claim 14, wherein the encrypted segment of media data is received with the encrypted segment key.

21. A non-transitory computer-readable medium, comprising:
  code for causing a computer to receive an encrypted segment of media data and an encrypted segment key over a unidirectional over-the-air (OTA) broadcast channel;
  code for causing the computer to provide an attestation request to an authenticator, wherein the authenticator is within the computer;
  code for causing the computer to receive an attestation response from the authenticator based on an interaction with authentication hardware to authenticate a user of the computer; and
  code for causing the computer to decrypt, after receiving the attestation response, an encrypted segment of media data using a segment key to generate a decrypted segment of media data, wherein the segment key is based on the encrypted segment key.

22. The computer-readable medium of claim 21, further comprising:
  code for causing the computer to provide the decrypted segment of media data for presentation to a user.

23. The computer-readable medium of claim 21, wherein the encrypted segment of media data is received with the encrypted segment key.

* * * * *